United States Patent
Itoh

(10) Patent No.: US 7,050,760 B2
(45) Date of Patent: May 23, 2006

(54) TERMINAL STATION CONTROLS TRANSMISSION POWER OF A BASE STATION

(75) Inventor: Katsutoshi Itoh, Tokyo (JP)

(73) Assignee: Sony Corporation (JP)

( * ) Notice: Subject to any disclaimer, the term of this patent is extended or adjusted under 35 U.S.C. 154(b) by 404 days.

(21) Appl. No.: 10/203,572

(22) PCT Filed: Dec. 18, 2001

(86) PCT No.: PCT/JP01/11088

§ 371 (c)(1),
(2), (4) Date: Aug. 9, 2002

(87) PCT Pub. No.: WO02/51040

PCT Pub. Date: Jun. 27, 2002

(65) Prior Publication Data

US 2003/0031135 A1   Feb. 13, 2003

(30) Foreign Application Priority Data

Dec. 18, 2000   (JP) ............................ 2000-383514

(51) Int. Cl.
*H04B 17/00* (2006.01)

(52) U.S. Cl. .................... 455/67.13; 455/522; 455/69; 455/13.4; 455/88; 370/328; 370/331

(58) Field of Classification Search ................ 455/522, 455/69, 13.4, 88, 67.11, 67.13, 70, 7, 14, 455/24; 370/328, 331, 252
See application file for complete search history.

(56) References Cited

U.S. PATENT DOCUMENTS

| | | | |
|---|---|---|---|
| 6,128,506 A * | 10/2000 | Knutsson et al. ........... | 455/522 |
| 6,272,354 B1 * | 8/2001 | Saario ........................ | 455/522 |
| 6,343,218 B1 * | 1/2002 | Kaneda et al. .............. | 455/522 |
| 6,404,826 B1 * | 6/2002 | Schmidl et al. ............. | 375/340 |
| 6,519,473 B1 * | 2/2003 | Park et al. .................. | 455/522 |
| 6,587,690 B1 * | 7/2003 | Di Huo et al. ............. | 455/446 |
| 6,628,924 B1 * | 9/2003 | Miyamoto ................... | 455/69 |
| 6,697,634 B1 * | 2/2004 | Hayashi ...................... | 455/522 |
| 6,799,045 B1 * | 9/2004 | Brouwer ..................... | 455/453 |
| 6,853,633 B1 * | 2/2005 | Ramesh ...................... | 370/347 |
| 2002/0077111 A1 * | 6/2002 | Spaling et al. .............. | 455/453 |
| 2002/0116523 A1 * | 8/2002 | Warrier et al. ............. | 709/238 |

\* cited by examiner

*Primary Examiner*—Edan Orgad
*Assistant Examiner*—Shaima Q. Aminzay
(74) *Attorney, Agent, or Firm*—Lerner, David, Littenberg, Krumholz & Mentlik, LLP

(57) ABSTRACT

A method and a system for controlling transmission power that recover a target signal interference ratio (SIR) calculated on a terminal station side from a state where it has become excessively large to a state where the target SIR is normal as quickly as possible are provided. In a system for controlling transmission power where transmission power at a base station is adjusted according to a power control signal received from a terminal station, the terminal station is configured with an error detector for outputting an error detection result in a received signal, a reception quality estimating unit for generating a received SIR (signal to noise ratio) obtained from the received signal, a reception quality averaging unit for outputting a target SIR by averaging output signals from the reception quality estimating unit, a reception quality setting unit for generating a target SIR from the received SIR and the error detection result, and a power control signal generator for adaptively generating the power control signal from the received SIR and the target SIR.

10 Claims, 13 Drawing Sheets

TERMINAL STATION CONTROLS TRANSMISSION POWER OF A BASE STATION

TECHNICAL FIELD

The present invention relates to a transmission power control method and system, and in particular, to a transmission power control method and system wherein a terminal station (receiving side) monitors a situation where a base station (transmitting side) is not following instructions to increase power and a situation where the base station is not following instructions to decrease power, and in the former situation, a power increase rate is increased, and in the latter situation, a power decrease rate is increased. Similarly, in the present system, a receiving side of the base station monitors situations where the terminal station is not following instructions to increase power and situations where the terminal station is not following instructions to decrease power, and the system is applicable to a transmission power control method and system for controlling transmission power of the terminal station.

BACKGROUND ART

In radio communications systems such as W-CDMA and cdma2000 which are attracting attention as third generation cellular phone systems, as one example of a system for maintaining a constant reception quality, there is a transmission power control method which adjusts transmission power such that reception quality is held constant. In these systems, a closed loop power control which controls transmission power of a base station by instructing a transmitter of the base station to decrease transmission power when reception quality measured at a terminal station exceeds a predetermined threshold, and by instructing the transmitter of the base station to increase transmission power when the reception quality is not greater than the threshold.

FIG. 1 is a block diagram of a typical base station in a W-CDMA cellular phone system. FIG. 2 is a block diagram of a conventional terminal station in the W-CDMA cellular phone system. FIG. 3 is a diagram showing a signal transmitted from the base station to the terminal station, where pilot data is inserted into each time slot by time multiplexing.

A transmission power control method at the base station is described hereafter. First, a method for controlling transmission power of the base station based on a power control signal from the terminal station is described with reference to FIG. 1. Data information including the power control signal transmitted from the terminal station is transmitted to a power control signal extracting unit 107 via a transceiver device 103, an RF unit 104, a reverse spreading unit 105, and a demodulating unit 106, after being received by an antenna 110 of a base station 100. At the power control signal extracting unit 107, only the power control signal is extracted. At a power controlling unit 108, whether the extracted power control signal is "1" or "0" is determined. When it is determined that the extracted power control signal is "1," a variable output amplifying unit 102 is adjusted so as to decrease transmission power by a predetermined fixed value (1 dB, for example), and when it is determined that it is "0," the variable output amplifying unit 102 is adjusted so as to increase transmission power by the predetermined fixed value mentioned above. An inputted modulated-spread-RF signal 101, has its transmission power controlled at the variable output amplifying unit 102, according to the power control signal from the terminal station as described above, and is transmitted to the terminal station from the antenna 110 via the transceiver device 103.

Next, a transmission procedure for the power control signal which the terminal station transmits to the base station is described with reference to FIG. 2. A pilot signal transmitted to a reception quality estimating unit 205 and an error detecting unit 207 via a transceiver device 201, an RF unit 202, a reverse spreading unit 203, and a demodulating unit 204 after being received at an antenna 213.

At the reception quality estimating unit 205, as shown in FIG. 3, a signal interference ratio (SIR) is estimated and outputted, as shown below in an equation (1), using pilot data which have been transmitted from the base station to the terminal station by means of radio time slots.

$$SIR = \frac{\left(\frac{1}{N}\sum_{j}^{N} p[j]\right)^2}{\sum_{i}^{N}\left(p[i] - \left(\frac{1}{N}\sum_{j}^{N} p[j]\right)\right)^2} \quad (1)$$

p[ ] in the equation (1) above is time multiplexed pilot data, and N is the number of the pilot data included in the slot. Also, the numerator of the equation (1) indicates a pilot signal level, and the denominator indicates an interference signal level which is obtained by subtracting the pilot signal level from the entire reception level.

The estimated received SIR is compared at a power control signal generating unit 206 with a target SIR which is to be set by a reception quality setting unit 208 described later. When the estimated received SIR level is higher than the target SIR, "1" is outputted, and when it is lower than the target SIR, "0" is outputted. The power control signal outputted from the power control signal generating unit 206 is inserted into a transmission signal 209 at a power control signal inserting unit 210 by means of time multiplexing, and is transmitted to the base station from the antenna 213 via a spreading unit 211, a modulating unit 212 and the transceiver device 201.

On the other hand, the error detecting unit 207 performs error correction on the data received from the base station for each encoding block unit (10, 20, 40 or 80 msec), and transmits an error detection result to the reception quality setting unit 208.

FIG. 4 is a flowchart showing processes of the reception quality setting unit 208. The reception quality setting unit 208 comprises an adjusting amount calculating unit 820 and a target SIR adjusting unit 840. The adjusting amount calculating unit 820 generates an adjusting amount to increase power at the base station when the error detecting unit 207 detects an error, and generates and outputs an adjusting amount to decrease power at the base station when the error detecting unit 207 does not detect an error.

When the adjusting amount calculating unit 820 determines, in a step S821, that the error detection result received from the error detecting unit 207 shows that there is an error, it calculates an adjusting amount of the target SIR by the following equation (2) in a step S822.

Adjusting amount=(1−target BLER×adjusting size)  (2)

On the other hand, when the adjusting amount calculating unit 820 determines, in the step S821, that the error detection result received from the error detecting unit 207 shows that there is an error, it calculates an adjusting amount of the target SIR by an equation (3) in a step S823.

$$\text{Adjusting amount} = -\text{target BLER} \times \text{adjusting size} \quad (3)$$

Next, in a step S841 of the target SIR adjusting unit 840, the adjusting amount obtained at the adjusting amount calculating unit 820 is added to an immediately preceding target SIR using an equation (4) below.

$$\text{Target SIR }[n] = \text{target SIR }[n-1] + \text{adjusting amount} \quad (4)$$

Here, the target SIR [n] is a target SIR outputted from the reception quality setting unit 208 at a moment n. And the target SIR [n−1] is a target SIR outputted from the reception quality setting unit 208 at a moment n−1 (immediate precedent, so to speak). And the target BLER is a target block error rate of the received data. This value varies depending on the service, and is notified from the base station to the terminal station before call connection. For example, for a service allowing retransmission with respect to packet transmission, 0.1 is chosen, and about 0.02 to 0.03 for audio communication. Further, the adjusting size is a predetermined fixed value, and is chosen to be about 0.5 dB. Here, incidentally, since adjustment of the target SIR is performed by block units as described above (every 10, 20, 40 or 80 msec), the movement is slower than the base station transmission power control which is updated with each time slot (0.667 msec). Further, the adjusting amount obtained in the step S822 is a positive value, and the adjusting amount obtained in the step S823 is a negative value. Accordingly, when using the adjusting amount obtained in the step S822, it functions to increase transmission power at the base station side, because the target SIR increases from its immediately preceding value. Also, when using the adjusting amount obtained in the step S823, it functions to decrease the transmission power at the base station side, because the target SIR decreases below its immediately preceding value. Thus, the base station transmission power control depends solely on the error detection results of the received signals at the receiving side.

FIG. 5 is a graph showing the change in target SIR over time with respect to base station transmission power control. In FIG. 5, the horizontal axis indicates time, each scale represents 10 ms, and the vertical axis shows a relative power level (dB) of the target SIR. In FIG. 5, the target BLER in the equations (2) and (3) are assumed to be 0.1, for example, and the adjusting size is assumed to be 0.5 dB, for instance. In this case, the adjusting amount in the equation (2) is (1−0.1)×0.5 dB=0.45 dB, while the adjusting amount in the equation (3) is −0.1×0.5 dB=−0.05 dB. Assuming that a time interval between [n] and [n−1] is 10 ms, for example, when it is determined that there is an error, the target SIR increases by 0.45 dB every 10 ms. When it is determined that there is no error, the target SIR decreases by 0.05 dB every 10 ms. Thus, as shown in FIG. 5, when it is determined that there is an error, the target SIR [n] increases rapidly, and when it is determined that there is no error, the target SIR [n] decreases, but the extent of decrease is smaller and more gentle compared to the case of an increase.

The power control signal generated at the power control generating unit 206 based on the target SIR obtained by the process mentioned above is transmitted from the terminal station to the base station. When power control at the base station is able to follow the power control signal, a normal power transmission control is performed, and the power at the base station becomes closer to the power corresponding to the target SIR of the terminal station, and stable power transmission control is performed.

However, in fact, the transmission power of the base station is finite and the maximum transmission power and the minimum transmission power transmitted from the base station are limited by the number of terminal stations present in a cell, and hardware limitations. Therefore, cases where the transmission power of the base station cannot follow instructions of the power control signal from the terminal station may arise. Problems which may arise in such cases are described in detail below.

FIG. 6 is an illustration showing an example of a positional relationship between a base station and a moving terminal station. In the figure, it is assumed that the terminal station moves in a direction of a zone A→a zone B→a zone C. The terminal station is assumed to receive radio waves directly from the base station in the zone A, to receive waves reflected off a building 13 as radio waves from the base station are blocked by a building 14 in the zone B, and to return to a state where radio waves from the base station can be received directly once again as blocking by the building 14 is resolved.

FIG. 7 is a graph showing a relationship between transmission power of the base station and the target SIR of the terminal station when the terminal station moves through the zone A→the zone B→the zone C. In FIG. 7, since power control is being performed normally in the zone A, both the target SIR value and the transmission power of the base station are small. When the terminal station enters a space between buildings in the zone B, because it is affected by shadowing, and errors in the received signal increase at the terminal station, the target SIR increases continuously. Following this, the base station tries to increase transmission power, but because the base station is insufficient in power resource, transmission power saturates at around −13 dB. Thus, because the received power at the terminal station does not increase, the received SIR received at the terminal station cannot reach the target SIR. Therefore, reception quality at the terminal station worsens, errors in reception blocks occur frequently, and the target SIR further continues to rapidly increase according to equation (2).

When the terminal station enters the zone C, it exits the space between the buildings, and reception is performed under favorable conditions as in the zone A. However, at this point, because the target SIR calculated at the terminal station is a value significantly higher than the SIR actually needed, the terminal station requests the base station to output excessive transmission power. On the other hand, as in the zone B, because the base station is not able to output transmission power above or equal to −13 dB, transmission power maintains a saturated state at around −13 dB. Since the terminal station is receiving excessive power from the base station, a state where no error occurs in the received data continues, and the target SIR tries to return gradually to the SIR actually needed. However, as described above, when the target BLER is small in the equation (3), because it takes time for the target SIR to return to the SIR actually needed, excessive base station transmission power is transmitted to the terminal station over an extended period. Because in a system of a multi-cell configuration such as cellular phones power transmitted by one base station becomes interference to another cell, there is a problem in that when the base station transmits excessive power, the bandwidth of the entire system deteriorates.

Similar situations may also occur when the number of users in a cell changes rapidly, and the maximum transmission power value allocated to each user changes.

Also, while a situation where the target SIR becomes excessively high is described above, when the minimum power at the base station is limited, the target SIR required by the terminal station becomes excessively low in a similar fashion. For example, when a propagation path quality rapidly worsens due to effects of fading or the like, it becomes impossible to transmit a power control signal for increasing the base station transmission power. In such a case, there is a problem in that received data significantly worsen, and call connection cannot be maintained.

Phenomena described above occur not only when the terminal station controls the transmission power at the base station, but also in the case of uplink power control where the base station controls the transmission power at the terminal station.

Also, although in the present embodiments cases in which the equation (2) and the equation (3) are used as calculation methods for the target SIR are mentioned, similar problems arise in all algorithms where a target BLER is adjusted by using the difference between an actual BLER and the target BLER.

DISCLOSURE OF THE INVENTION

The present invention has been invented in consideration of the above-mentioned problems, and its object is to provide a method and a system for transmission power control, which recover a target SIR to a normal state as quickly as possible from a state where the target SIR calculated at a terminal station side has become excessively large.

To achieve the above-mentioned object, in a transmission power control system where transmission power at a base station is adjusted according to a power control signal received from a terminal station, the present invention is configured such that the terminal station comprises error detecting means for outputting an error detection result of a received signal, reception quality estimating means for generating a received SIR (signal to noise ratio) obtained from the received signal, reception quality averaging means for averaging outputted signals from the reception quality estimating unit to output an average received SIR, reception quality setting means for generating a target SIR from the received SIR and the error detection result, and power control signal generating means for adaptively generating the power control signal from the received SIR and the target SIR.

Further, the reception quality averaging means of the present invention is configured to generate the average received SIR by averaging the received SIR's over a frame period.

In addition, the reception quality setting means of the present invention comprises base station power control status monitoring means for finding the difference between the average received SIR and an immediately preceding target SIR, and monitoring from the difference a state where the base station is not following instructions to increase power and a state where the base station is not following instructions to decrease power; and adjusting amount correcting means for increasing a power increase rate when the base station is not following instructions to increase power, and for increasing a power decrease rate when the base station is not following instructions to decrease power, and is configured to generate the target SIR according to the adjusting amount from the adjusting amount correcting means in a situation where the base station is not following instructions to increase power and in a situation where the base station is not following instructions to decrease power.

Further, the present invention is configured such that, during call connection of the terminal station, it generates the target SIR while assuming that the base station is in a state where it is not following instructions to increase power or that the base station is in a state where it is not following instructions to decrease power.

BEST MODE FOR IMPLEMENTING THE INVENTION

Figure 1:
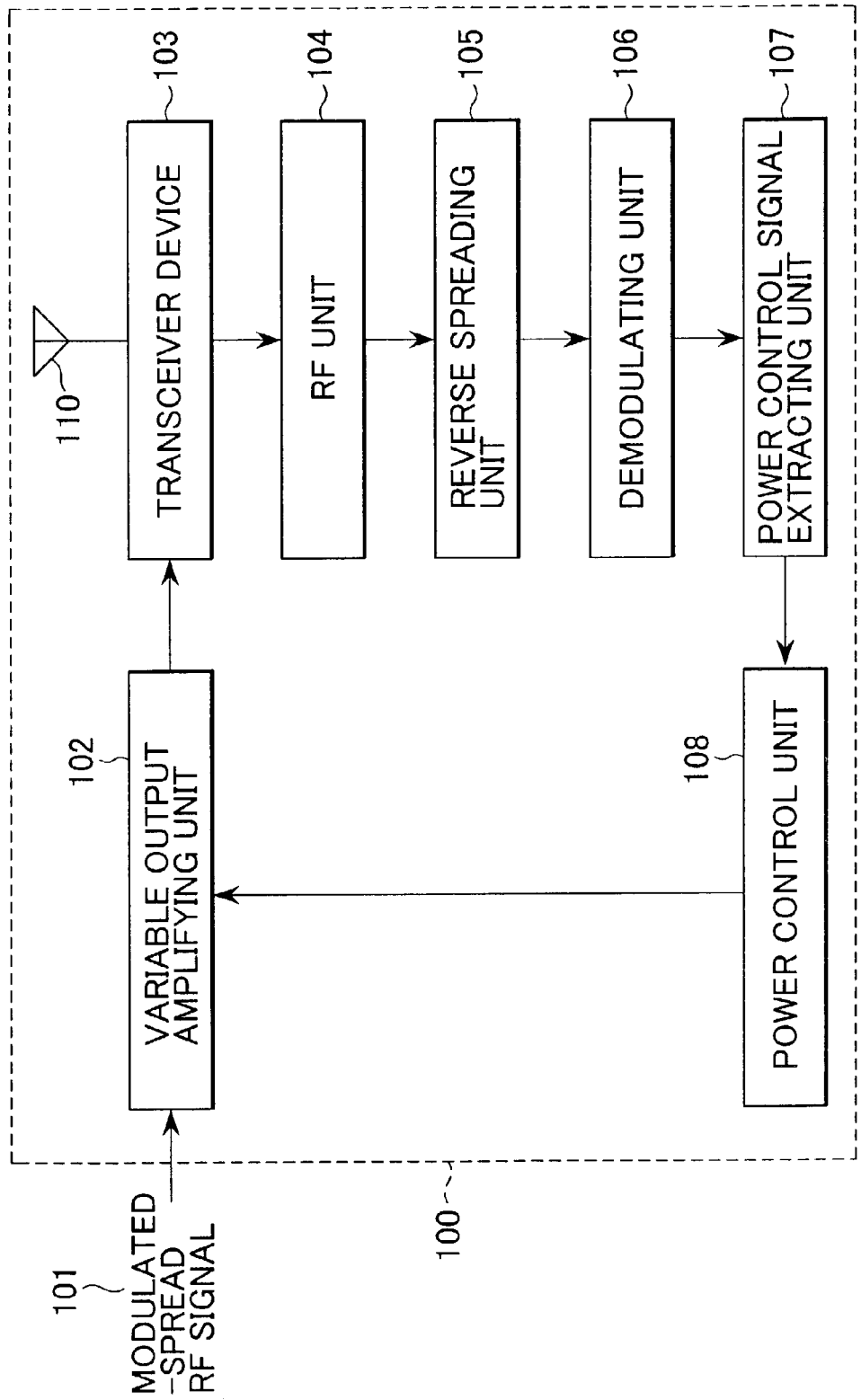
FIG. 1 is a block diagram of a typical base station in a W-CDMA cellular phone system.
Figure 2:
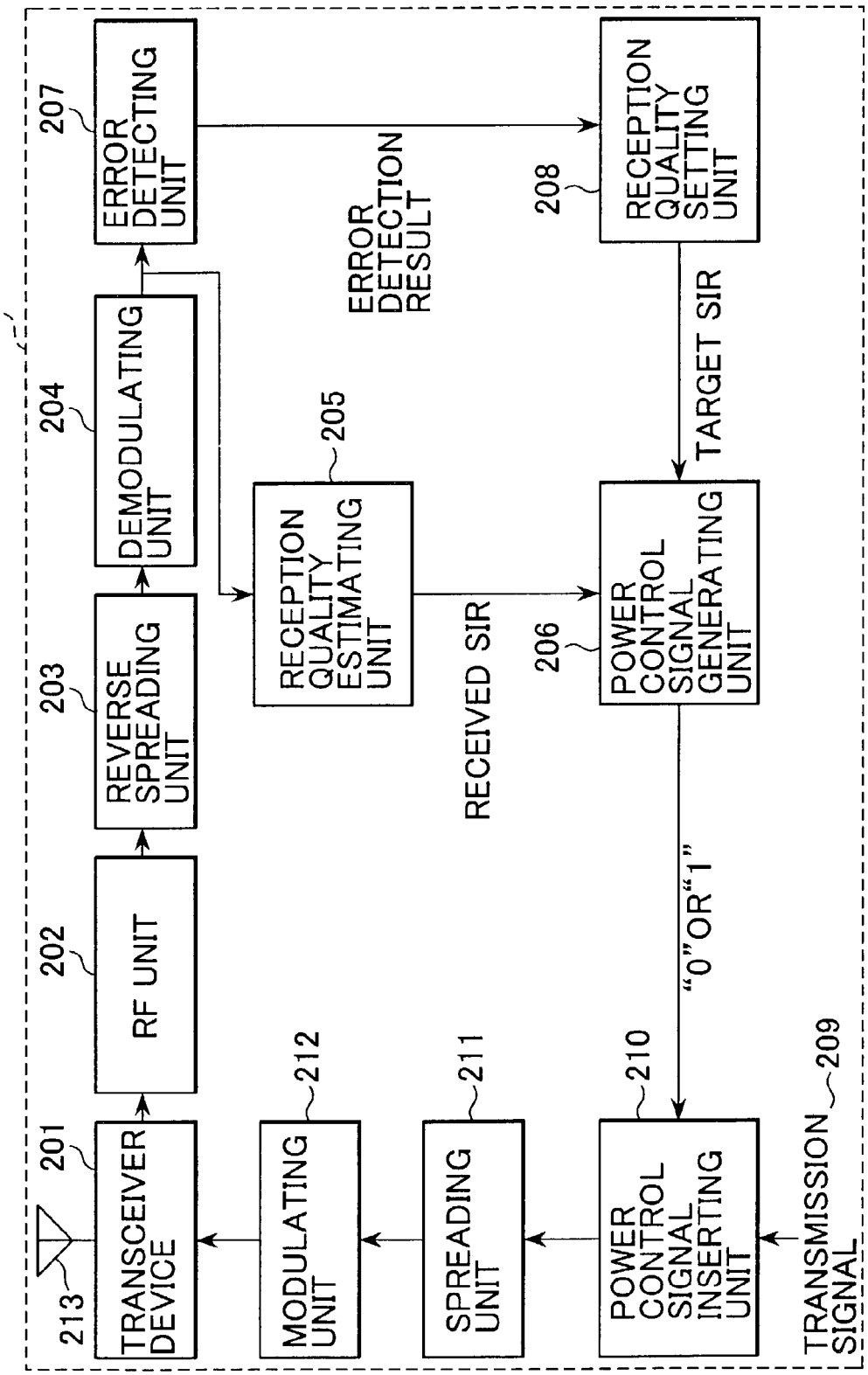
FIG. 2 is a block diagram of a typical terminal station in a W-CDMA cellular phone system.
Figure 3:
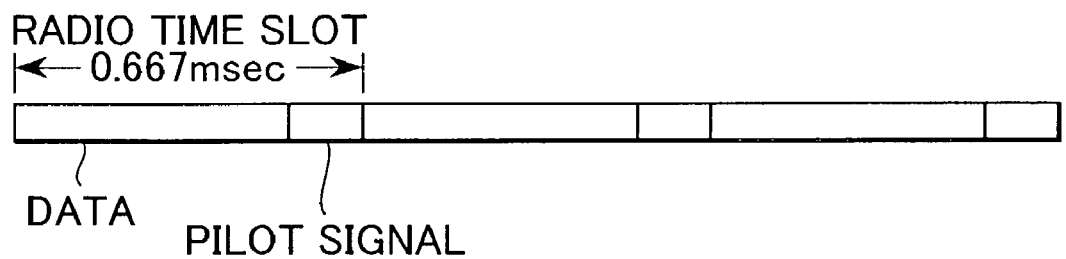
FIG. 3 is a diagram showing a signal, in which pilot data is inserted into each time slot by time multiplexing, transmitted from a base station to a terminal station.
Figure 4:
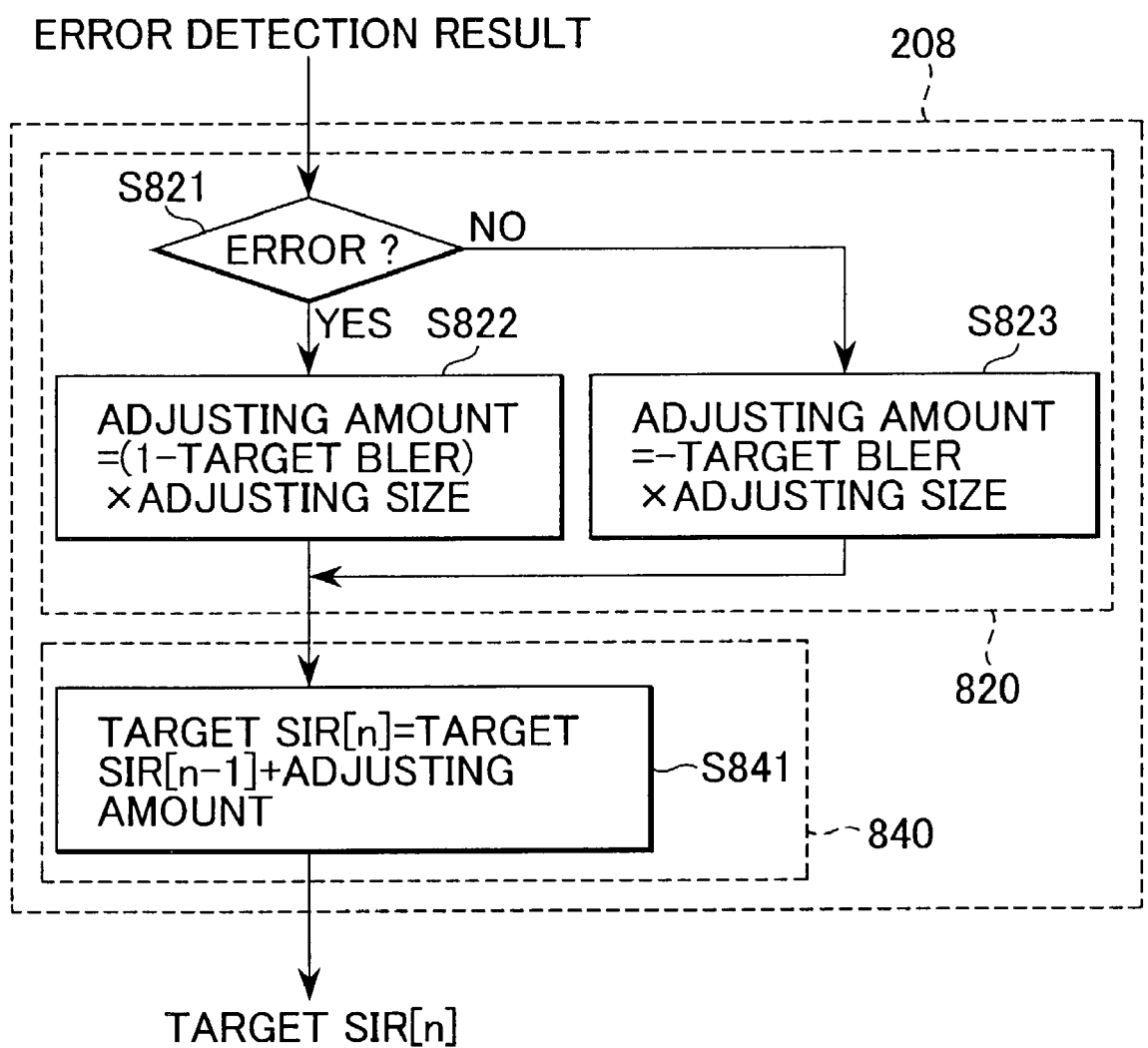
FIG. 4 is a flowchart showing processing by a reception quality setting unit.
Figure 5:
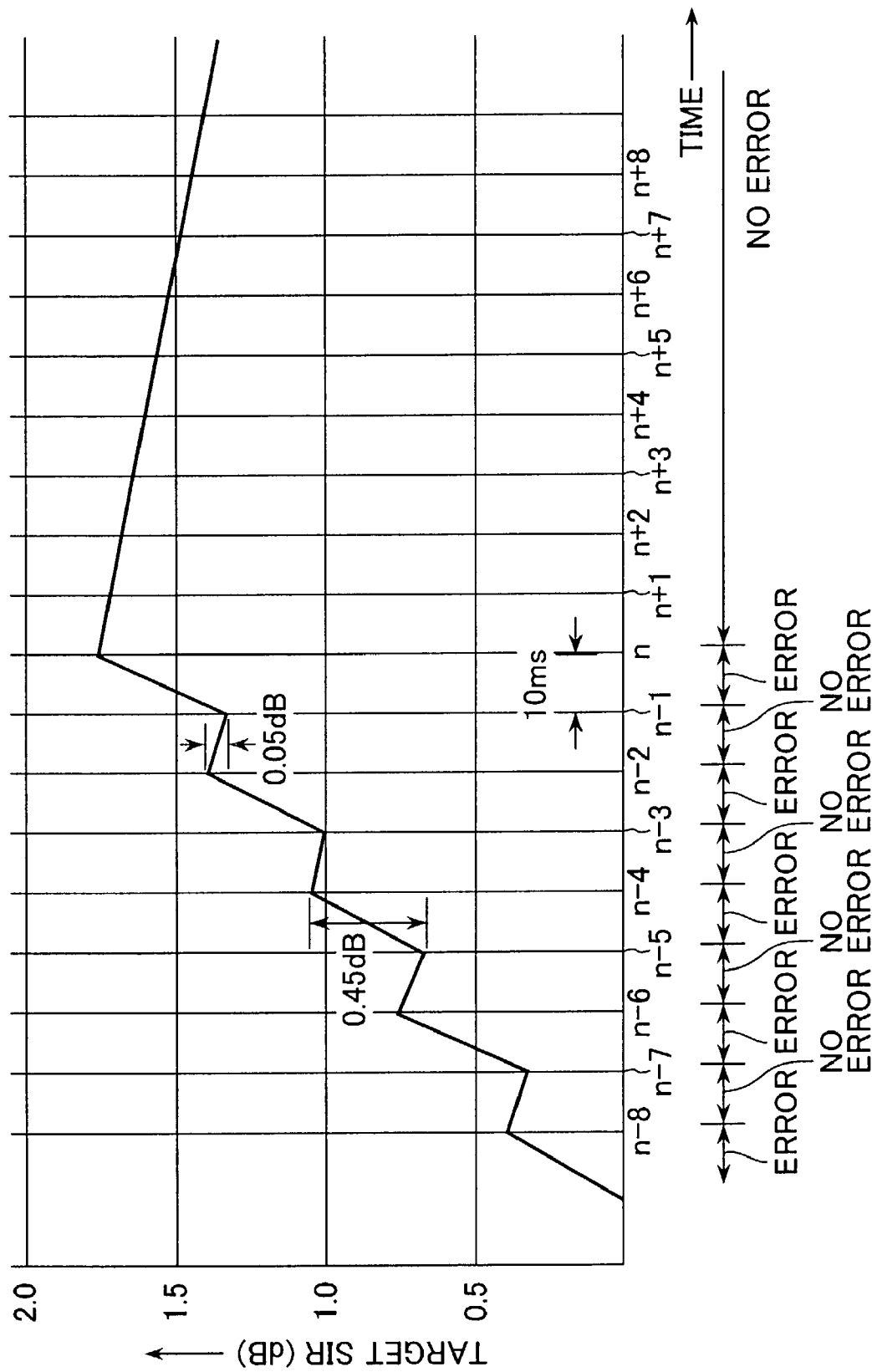
FIG. 5 is a graph showing changes in a target SIR over time with respect to base station transmission power control.
Figure 6:
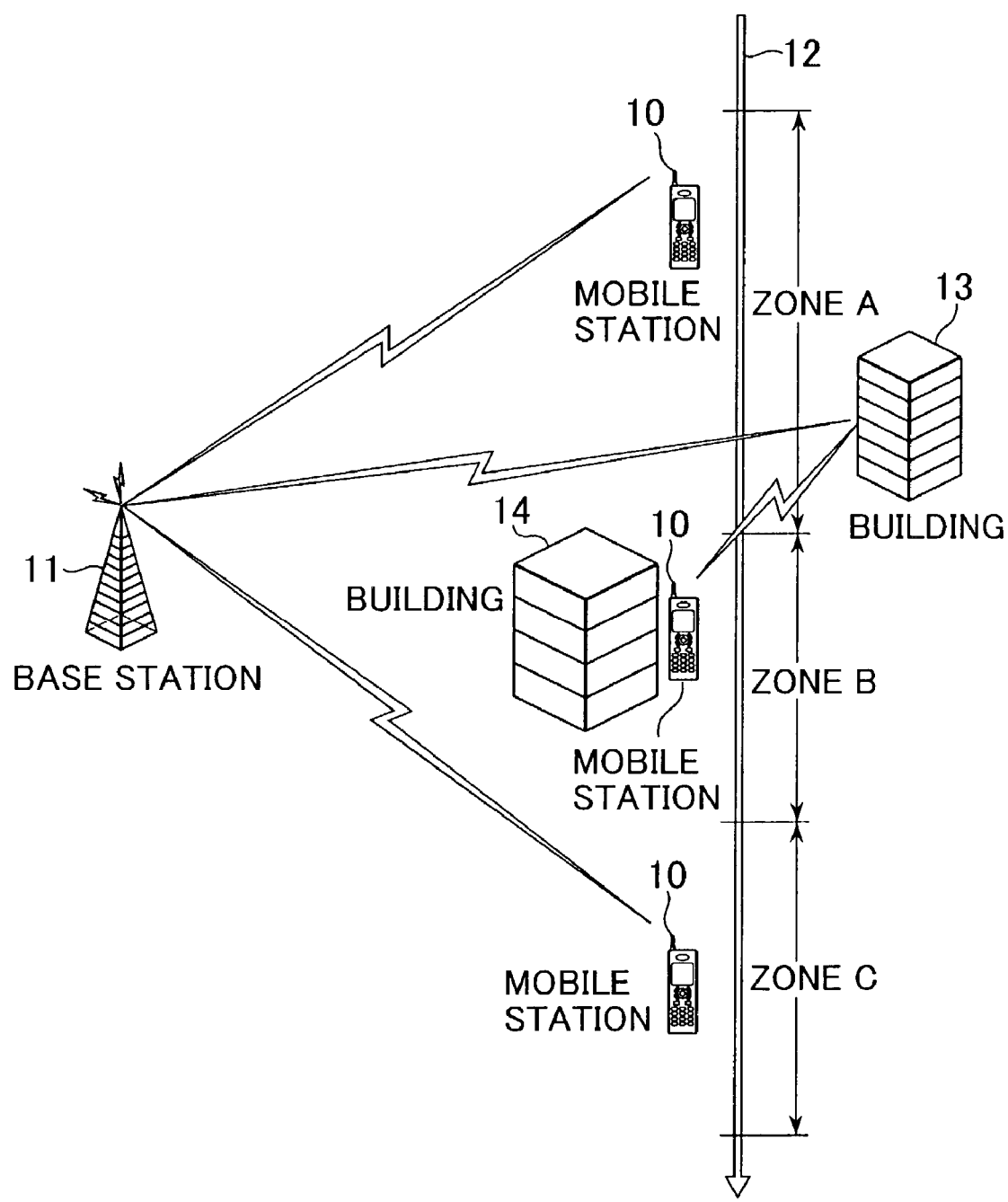
FIG. 6 is a diagram showing an example of a positional relationship between a base station and a terminal station which is moving.
Figure 8:
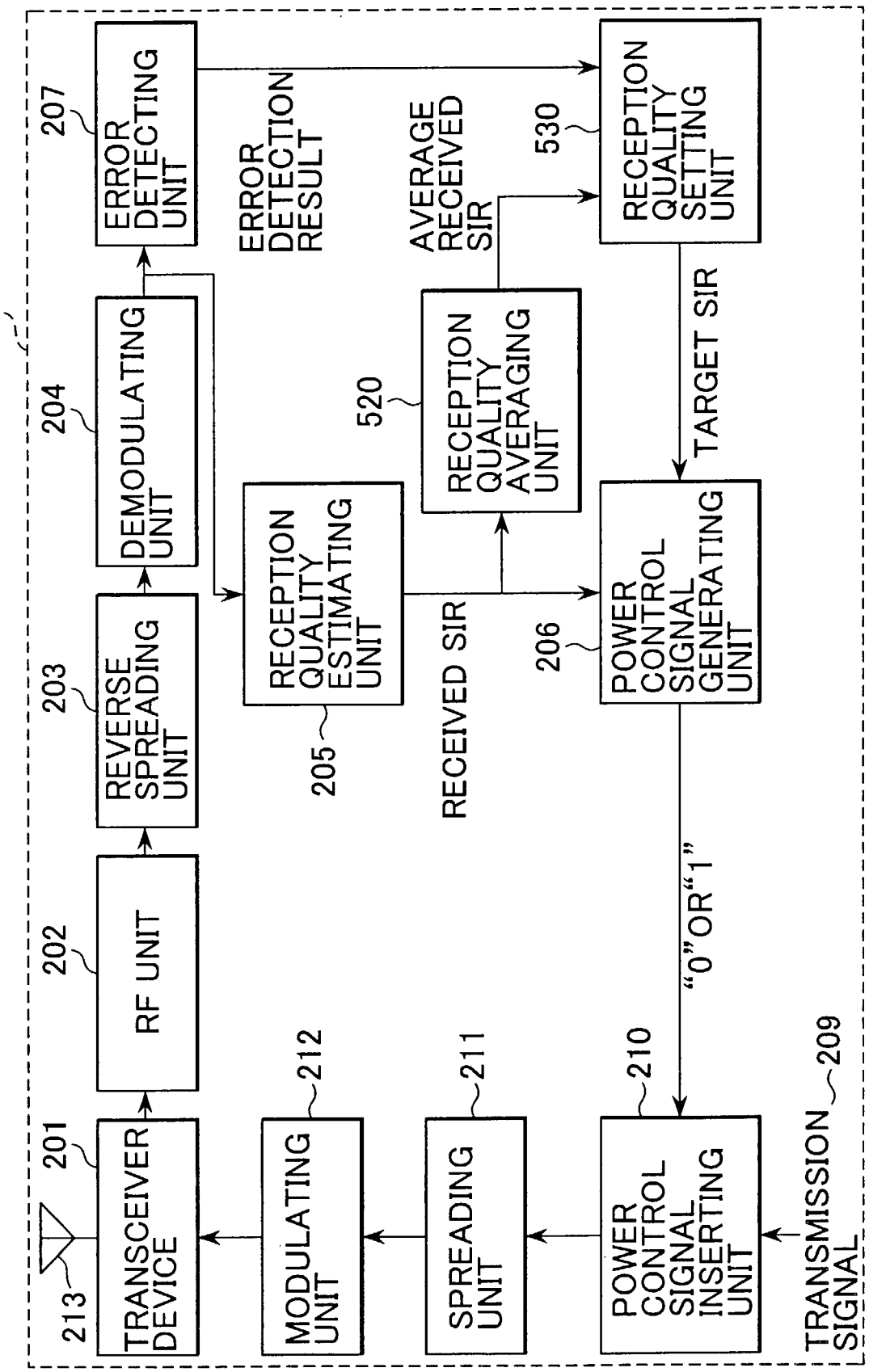
FIG. 8 is a diagram showing an apparatus configuration of a terminal station of an embodiment of the present invention.

A transmission power control system of the present invention is described below. FIG. 8 is a diagram showing an apparatus configuration of a terminal station 500 as an embodiment according to the present invention. In FIG. 8, the terminal station 500 comprises an antenna 213, a transceiver device 201 for separating transmission waves from reception waves, an RF unit 202 for processing received signals, a reverse spreading unit 203, a demodulating unit 204, a reception quality estimating unit 205 for estimating received signal quality, a reception quality averaging unit 520, an error detecting unit 207 for performing error correction on received frame data and error detection, a reception quality setting unit 530 for calculating a target SIR, a power control signal generating unit 206 for generating a power control signal which adjusts base station transmission power, a power control signal inserting unit 210 for processing a transmission signal, a spreading unit 211, and a modulating unit 212. The terminal station 500 of FIG. 8 has the reception quality averaging unit 520 and the reception quality setting unit 530 added to a terminal station 200 shown in FIG. 2. Other elements are the same as the elements of the previously described terminal station, and therefore descriptions are omitted.

Below, operations of the terminal station 500 of the present invention are described with reference to FIG. 8. In FIG. 8, a transmission signal transmitted from the base station is received via the antenna 213, the transceiver device 201, the RF unit 202, the reverse spreading unit 203, and the demodulating unit 204 of the terminal station 500. With respect to the received signal, a received SIR is estimated at the reception quality estimating unit 205. An estimation method for the received SIR is given by the foregoing equation (1). The estimated received SIR is compared with a target SIR at the power control signal generating unit 206. When the received SIR is lower than the target SIR, the power control signal generating unit 206 outputs "0" which instructs the base station to increase transmission power. When the received SIR is higher than the target SIR, the power control signal generating unit 206 outputs "1" which instructs the base station to decrease transmission power. The outputted power control signal and the transmission signal 209 are time multiplexed at the power control signal inserting unit 210, and are transmitted to the base station via the spreading unit 211, the modulating unit 212, the transceiver device 201 and the antenna 213. In the present invention, the target SIR is calculated at the reception quality setting unit 530 according to an error detection result within a data block, which is an output from the error detecting unit 207, and according to an average received SIR, which is an output from the reception quality averaging unit 520.

Figure 9:
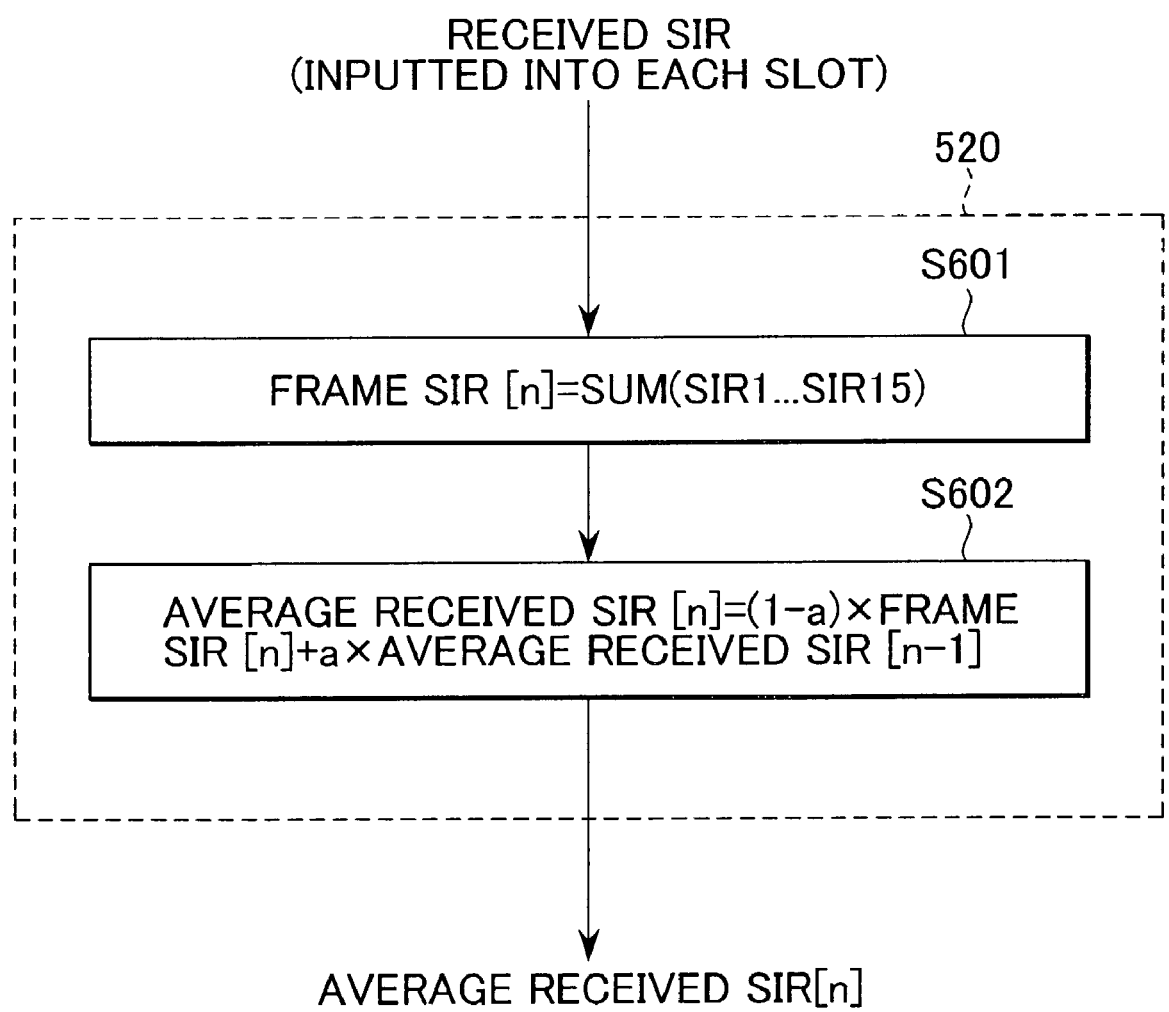
FIG. 9 is a flowchart showing processing at a reception quality averaging unit of an embodiment of the present invention.

FIG. 9 is a flowchart showing processing at the reception quality averaging unit 520. Hereafter, the processing at the reception quality averaging unit 520 is described in detail. As shown in FIG. 9, the reception quality averaging unit 520, in a step S601, can obtain a frame SIR which has received SIR's outputted with every slot (0.667 msec) from the reception quality estimating unit 205 averaged within a frame. Further, in a step S602, an average received SIR is obtained by interframe averaging of frame SIR's with an IIR filter. By performing interframe averaging as such, instantaneous change components of propagation characteristics can be eliminated. Here, a is a coefficient satisfying 0<a<1 and is determined in view of various environment conditions and system status.

Figure 10:
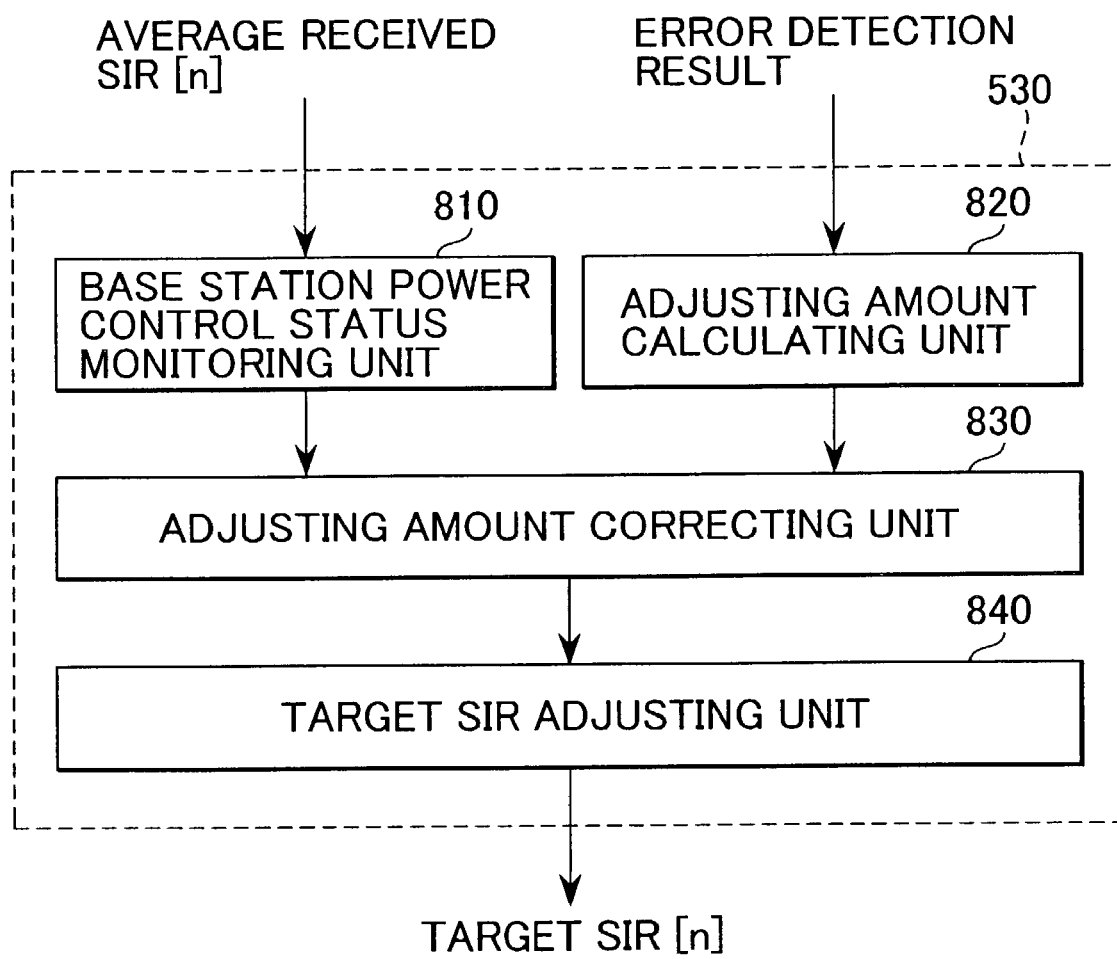
FIG. 10 is a diagram showing an apparatus configuration of a reception quality setting unit of an embodiment of the present invention.

Next, processing at the target reception quality setting unit 530 is described in detail. FIG. 10 is a diagram showing an apparatus configuration of the reception quality setting unit 530. The reception quality setting unit 530 as shown in FIG. 10 comprises a base station power control status monitoring unit 810, an adjusting amount calculating unit 820, an adjusting amount correcting unit 830, and a target SIR adjusting unit 840. The average received SIR from the reception quality averaging unit 520 and the error detection result, which is an output from the error detecting unit 207, are inputted into the reception quality setting unit 530, and a target SIR processed and calculated by the base station power control status monitoring unit 810, the adjusting amount calculating unit 820, the adjusting amount correcting unit 830, and the target SIR adjusting unit 840 is outputted.

Hereafter, processing at the base station power control status monitoring unit 810 of the reception quality setting unit 530 is described in detail. The base station power control status monitoring unit 810 obtains the difference between an immediately preceding target SIR and the average received SIR, and through that difference monitors situations where the base station is not following instructions to increase power and situations where the base station is not following instructions to decrease power.

Figure 11:
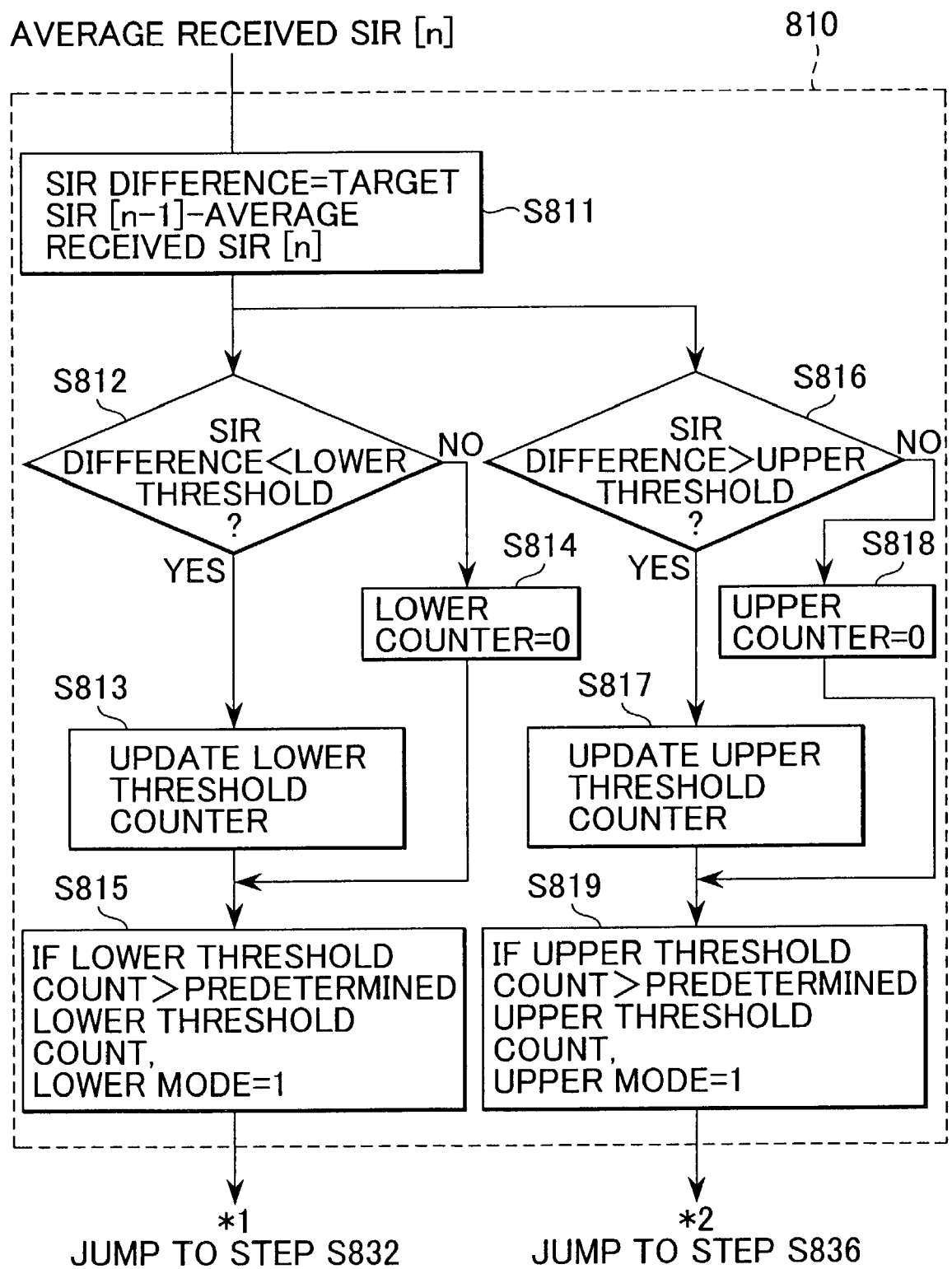
FIG. 11 is a drawing showing a process flowchart of a base station power control status monitoring unit of the reception quality setting unit of an embodiment of the present invention.

FIG. 11 is a process flowchart of the base station power control status monitoring unit 810 of the reception quality setting unit 530. As shown in a step S811, an SIR difference is obtained from the average received SIR [n] inputted to the reception quality setting unit 530 according to the formula "immediately preceding target SIR—average received SIR." This SIR differential value is an index indicating whether or not the reception quality is following a quality set by the terminal station, and is inputted into next steps S812 and S816, and a followance status of the base station power control is detected. A larger absolute value of the SIR differential value indicates a lower followance of the reception quality.

Figure 12:
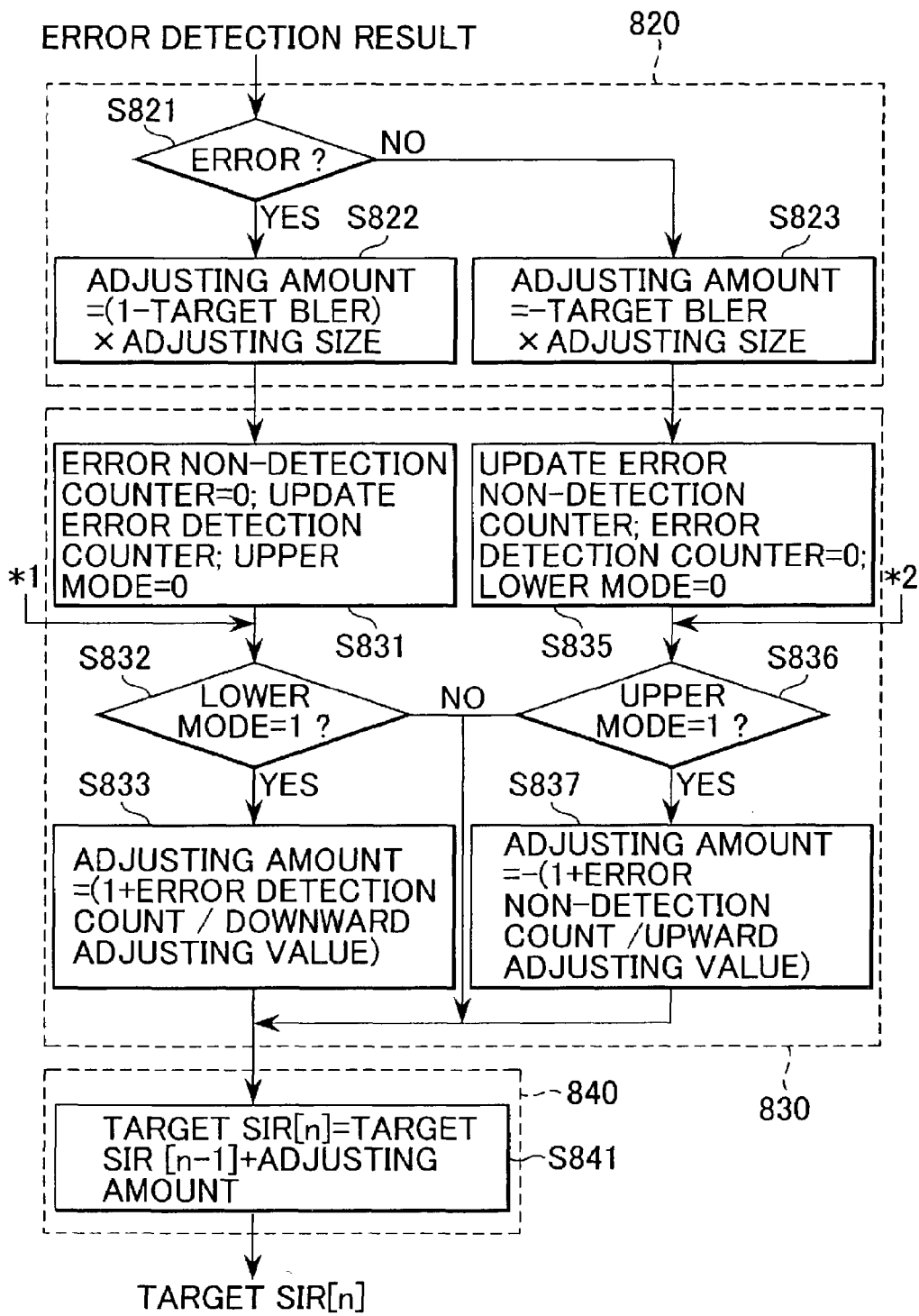
FIG. 12 is a drawing showing a process flowchart of an adjusting amount calculating unit, an adjusting amount correcting unit and a target SIR adjusting unit in the reception quality setting unit of an embodiment of the present invention.

In the step S812, if SIR difference<lower threshold, that is, in a situation where the base station transmission power does not become lower than a requested value, a lower threshold counter is updated (step S813), and when a count of this counter is equal to or greater than a predetermined lower threshold count value, that is, when this situation continues successively for a period equal to or greater than that indicated by the threshold count value, u_mode=1 (lower mode=1) is set (step S815), and the process jumps to a step S832 of FIG. 12. In addition, if SIR difference=lower threshold, that is, in a situation where the base station transmission power is lowered to the requested value, a lower counter is reset (step S814).

On the other hand, in the step S816, if SIR difference>upper threshold, that is, in a situation where the base station transmission power has not increased to the requested value, an upper threshold counter is updated (step S817), and when a count value of this counter is equal to or greater than a predetermined upper threshold count value, that is, when the situation continues successively for a period equal to or greater than that indicated by the upper threshold count value, o_mode=1 (upper mode=1) is set (step S819), and the process jumps to a step S836 of FIG. 12. In addition, if SIR difference=upper threshold, that is, in a situation where the base station transmission power increases to the requested value, an upper counter is reset (step S818).

Next, processing at the adjusting amount calculating unit 820 to the target SIR adjusting unit 840 of the reception quality setting unit 530 is described in detail. FIG. 12 is a drawing showing a process flowchart from the base station power control status monitoring unit 820 to the target SIR adjusting unit 840 of the reception quality setting unit 530. First, the base station power control status monitoring unit 820 of FIG. 12 is described. The adjusting amount calculating unit 820 has the same configuration as is conventional, generates an adjusting amount which increases a power increase rate in a case of a situation where the base station is not following instructions to increase power, and generates an adjusting amount which increases a power decrease rate in a case of a situation where the base station is not following instructions to decrease power. At the base station power control status monitoring unit 820, whether or not the error detection result inputted from the error detecting unit 207 has an error is determined in the step S821, and if it is determined that there is an error, the adjusting amount is set to "(1−target BLER)×adjusting size" in the step S822, while on the other hand, if it is determined that there is no error, the adjusting amount is set to "–target BLER×adjusting size" in the step S823. In other words, when there is an error, a positive adjusting amount is set, while when there is no error, a negative adjusting amount is set in the steps S822 and S823, respectively.

Next, the adjusting amount correcting unit 830 is described. The adjusting amount correcting unit 830 receives a mode status from the base station power control status monitoring unit 810, and generates a corrected adjusting amount. In a processing step S831 of the adjusting amount correcting unit 830, when a positive adjusting amount is inputted from the step S822, an error non-detection counter (which counts the number of times data blocks are correctly received consecutively) is set to "0" (reset), an error detection counter (which counts the number of times errors have occurred in succession) is updated and o_mode is set to "0" (reset). Then, in the step S832, it is determined whether o_mode is "1" or not, and if it is "1", the adjusting amount is set to "(1+error detection count/downward correcting value). In other words, in the processing step S832, a state where an error has occured even though the received SIR is higher than the target SIR, that is, a state where the target SIR must be increased more rapidly than usual is detected, and in the processing step S833, the target SIR adjusting amount is increased according to the number of times errors have occurred in succession. The downward adjusting value, which is a parameter herein, is a predetermined value, and is one which determines a converging speed of the target SIR.

On the other hand, when a negative adjusting amount is inputted from the step S823, the error non-detection counter is updated and the error detection counter is reset to "0," and o_mode is set to "0." Then, in the step S836, it is determined whether o_mode is "1" or not, and if it is "1", the adjusting amount is set to" (1+error non-detection count/upward adjusting value) (step S837). In other words, in the processing step S836, a situation where no error occurs even though the received SIR is lower than the target SIR, that is, a situation where the target SIR must be decreased more rapidly than usual is detected, and the target SIR decrease amount is increased according to the number of times error free states have occurred in the processing step S837. The upward adjusting value which is a parameter herein is a predetermined value, and is one which determines a converging speed of the target SIR.

Next, the target SIR adjusting unit 840 is described. The target SIR adjusting unit 840 selects either the adjusting amount from the adjusting amount calculating unit 820 or the adjusting amount from the adjusting amount correcting unit 830, and generates a target SIR by adding the adjusting amount to an immediately preceding target SIR. As for selection of the adjusting amount, when it is determined No in the steps S832 or S836 of FIG. 12, that is, when o_mode=0 or u_mode=0, the adjusting amount from the error detection result is selected.

At the target SIR adjusting unit 840, in the step S841, the adjusting amounts inputted from the step S833 and the step S837 are added to the target SIR [n−1], or the adjusting amounts generated at the step S822 and the step S823 are added to the target SIR [n−1], and are outputted as a target SIR [n].

As described above, in the present embodiments, by measuring the difference between the average received SIR and the target SIR, an occurrence of a situation where the base station is unable to follow the target SIR required by the terminal station is detected, and by varying the adjusting amount of the target SIR depending on the error occurrence condition thereafter, an optimal target SIR is obtained more rapidly and optimal base station transmission power control becomes possible.

Figure 7:
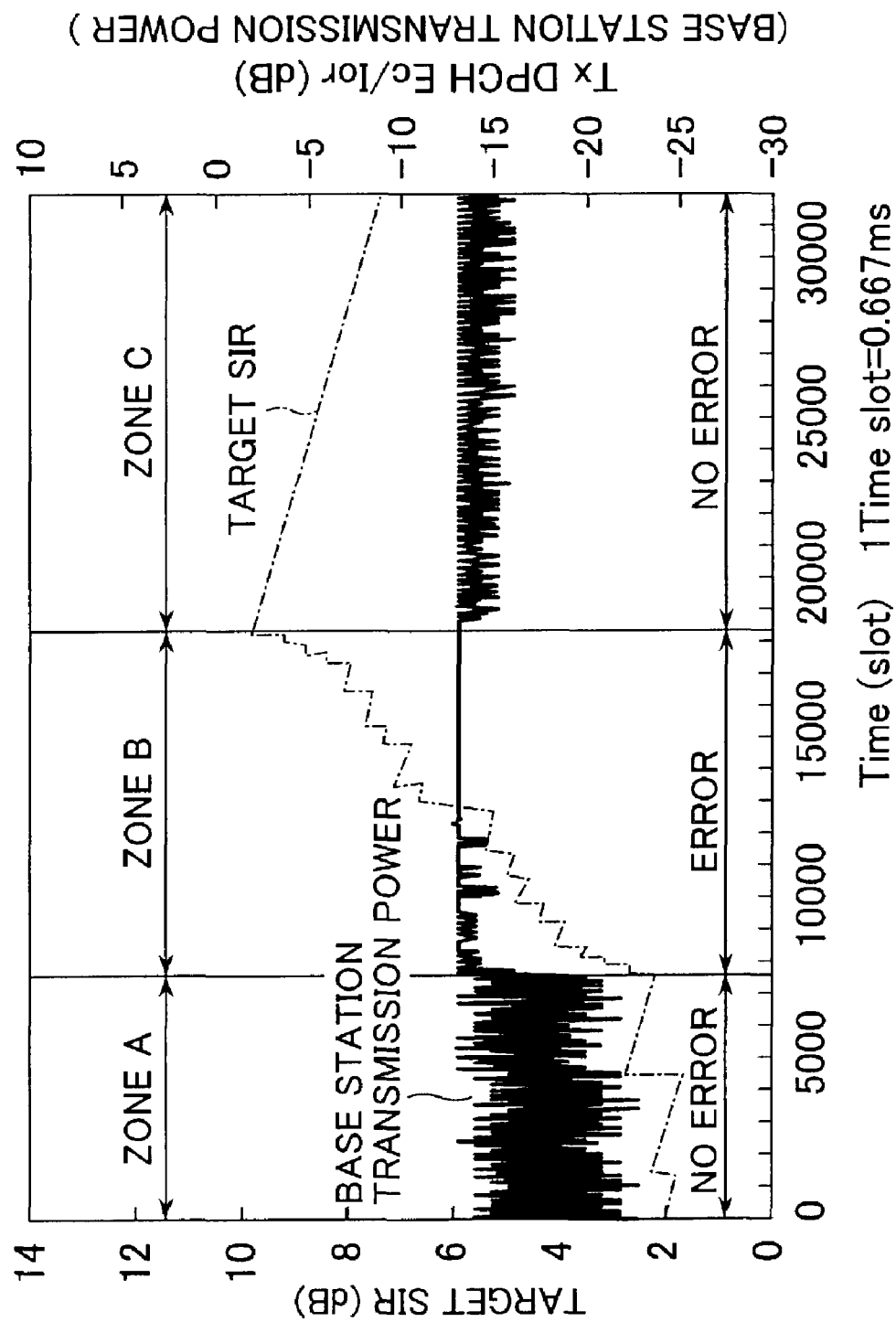
FIG. 7 is a graph showing the relationship between base station transmission power and a target SIR at the terminal station in a base satation power control method.
Figure 13:
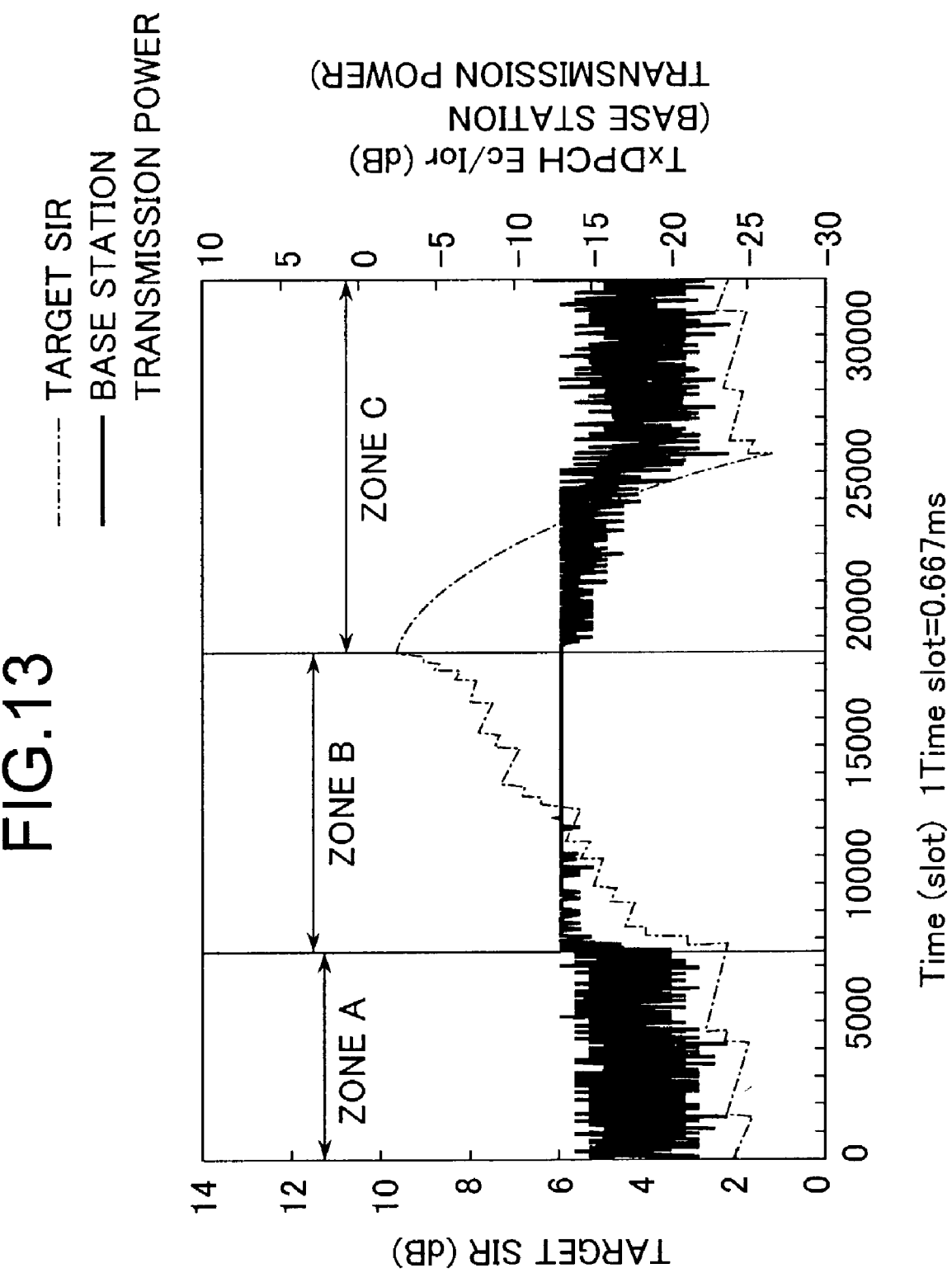
FIG. 13 is a graph showing the relationship between base station transmission power and a target SIR at the terminal station in a base station power control method of the present invention.

FIG. 13 is a graph showing fluctuations in target SIR and changes in base station transmission power when the present control method is employed. Compared with the drawing showing changes in base station transmission power as indicated in FIG. 7, by applying the present invention, it can be seen that the target SIR rapidly converges to an expected value in the zone C, and that excessive power transmission time is shortened.

Also, in actual communication situations, since the target BLER and the corresponding target SIR vary depending on conditions of propagation paths, it is difficult to set an accurate target SIR at an initial state of call connection. Therefore, at the initial state of call connection, by setting initial values of o_mode and u_mode of FIG. 12 each to 1, it is possible to execute the step S833 and the step S837 mandatorily, and thereby converge the target SIR to an expected value rapidly.

In addition, processing at the terminal station is described herein based on the assumption that the base station transmission power is controlled, however, with respect to power control, uplink power control where the transmission power of the terminal station is controlled is also realized in a similar method. In such a case, the base station of the present embodiment operates as the terminal station, and the terminal station operates as the base station

INDUSTRIAL APPLICABILITY

According to the transmission power control method of the present invention, by measuring the difference between the target SIR estimated at the receiver side and the average received SIR, it becomes possible to detect an occurrence of a situation where the base station is not able to follow the target SIR requested by the terminal station.

Further, upon detection of the above situation, by changing the adjusting amount of the target SIR according to the occurrence status of received data errors, the optimal target SIR value can be obtained more rapidly, and optimal transmission power control becomes possible.

By performing optimal transmission power control, an excessive emission of transmission power of the base station or the terminal station can be prevented, and interference with other cells or other users can be reduced.

In addition, an excessive reduction in transmission power of the base station or the terminal station can be prevented, and degradation of reception quality can be reduced.

Further, at the initial state of call connection, the optimal target SIR value can be obtained mandatorily and rapidly.

The invention claimed is:

1. A transmission power control method where a transmission power of a base station is adjusted according to a power control signal received from a terminal station, said transmission power control method comprising the steps of:
generating an average received signal interference ratio given by averaging received signal interference ratios obtained from a received signal over a predetermined time period;
generating a signal interference ratio difference value by calculating a difference between said average received signal interference ratio and a target signal interference ratio generated previously;

generating a first adjusting amount for said target signal interference ratio according to said signal interference ratio difference value;

detecting whether a received signal has an error and generating an error detection result;

generating a second adjusting amount according to said error detection result;

determining whether said signal interference ratio difference value is within a predetermined range, selecting said second adjusting amount when said signal interference ratio difference value is within the predetermined range, and selecting said first adjusting amount when said signal interference ratio difference value is not within the predetermined range;

generating an updated target signal interference ratio by updating said target signal interference ratio generated previously based on said selected one of first adjusting amount and said second adjusting amount;

generating said power control signal based on a comparison result between said received signal interference ratio and said updated target signal interference ratio; and transmitting said power control signal to said base station.

2. The transmission power control method of claim 1, characterized in that said average received signal interference ratio is generated by averaging said received signal interference ratios over a frame period.

3. The transmission power control method of claim 1, characterized in that said first adjusting amount is generated based on a frequency of detecting said error at said step for detecting said error when said signal interference ratio difference value is less than a lower threshold of said predetermined range, and is generated based on a frequency of non-detecting said error at said step for detecting said error when said signal interference ratio difference value is higher than an upper threshold of said predetermined range.

4. The transmission power control method of claim 3, characterized in that said first adjusting amount is generated according to equation (1) when said signal interference ratio difference value is less than a lower threshold of said predetermined range; and $$\text{First Adjusting Amount} = (1 + \text{Error\_Detection\_Count} / \text{Downward\_Adjusting\_Value}) \quad (1)$$

said first adjusting amount is generated according to equation (2) when said signal interference ratio difference value is higher than an upper threshold of said predetermined range;

$$\text{First Adjusting Amount} = -(1 + \text{Error\_Non-Detection\_Count} / \text{Upward\_Adjusting\_Value}) \quad (2)$$

wherein said Downward_Adjusting_Value and Upward_Adjusting_Value are predetermined values for respectively determining a converging speed of said target signal interference ratio.

5. A radio communications terminal apparatus for generating a power control signal to adjust a transmission power of a base station, said radio communications mobile terminal apparatus comprising:

a reception quality averaging unit configured to generate an average received signal interference ratio given by averaging received signal interference ratios obtained from a received signal over a predetermined period;

a signal interference ratio difference value generating unit configured to generate a signal interference ratio difference value by calculating a difference between said average received signal interference ratio and a target signal interference ratio generated previously;

a first adjusting amount generating unit configured to generate in said terminal apparatus an adjusting amount for said target signal interference ratio according to said signal interference ratio difference value;

a detecting unit configured to detect whether a received signal has an error and to generate an error detection result;

a second adjusting amount generating unit configured to generate a second adjusting amount according to said error detection result;

a selecting unit configured to determine whether said signal interference ratio difference value is within a predetermined range, to select said second adjusting amount when said signal interference ratio difference value is within the predetermined range, and to select said first adjusting amount when said signal interference ratio difference value is not within the predetermined range;

an updated target signal interference ratio generating unit configured to generate an updated target signal interference ratio by updating said target signal interference ratio generated previously based on said selected one of said first adjusting amount and said second adjusting amount;

a power control signal generating unit configured to generate said power control signal based on a comparison result between said received signal interference ratio and said updated target signal interference ratio.

6. The radio communications mobile terminal apparatus of claim 5, characterized in that said average received signal interference ratio is generated by averaging said received signal interference ratios over a frame period.

7. The radio communication terminal apparatus of claim 5, characterized in that said first adjusting amount is generated based on a frequency of detecting said error when said signal interference ratio difference value is less than a lower threshold of said predetermined range, and is generated based on a frequency of non-detecting said error when said signal interference ratio difference value is higher than an upper threshold of said predetermined range.

8. The radio communication terminal apparatus of claim 7, characterized in that said first adjusting amount is generated according to equation (1) when said signal interference ratio difference value is less than a lower threshold of said predetermined range; and $$\text{First Adjusting Amount} (1 + \text{Error\_Detection\_Count\_}/\text{Downward\_Adjusting\_Value}) \quad (1)$$

said first adjusting amount is generated according to equation (2) when said signal interference ratio difference value is higher than an upper threshold of said predetermined range;

$$\text{First Adjusting Amount} = -(1 + \text{Error\_Non-Detection\_Count}/\text{Upward\_Adjusting\_Value}) \quad (2)$$

wherein said Downward_Adjusting_Value and Upward_Adjusting_Value are predetermined values for respectively determining a converging speed of said target signal interference ratio.

9. A transmission power control system for adjusting a power of a base station according to a power control signal received from a terminal station, said transmission power control system comprising:

a terminal station including a reception quality averaging unit configured to generate an average received signal interference ratio given by averaging received signal interference ratios obtained from a received signal over a predetermined time period;

a signal interference ratio difference value generating unit configured to generate a signal interference ratio difference value by calculating a difference between said average received signal interference ratio and a target signal interference ratio generated previously;

a first adjusting amount generating unit configured to generate an adjusting amount for said target signal interference ratio according to said signal interference ratio difference value;

a detecting unit configured to detect whether a received signal has an error and to generate an error detection result;

a second adjusting amount generating unit configured to generate a second adjusting amount according to said error detection result;

a selecting unit configured to determine whether said signal interference ratio difference value is within a predetermined range, to select said second adjusting amount when said interference ratio difference value is within the predetermined range, and to select said first adjusting amount when said signal interference ratio difference is not within the predetermined range;

an updated target signal interference ratio generating unit configured to generate an updated target signal interference ratio by updating said target signal interference ratio generated previously based on said selected one of said first adjusting amount and said second adjusting amount;

a power control signal generating unit for generating said power control signal based on a comparison result between said received signal interference ratio and said updated target signal interference ratio;and a transmitting unit configured to transmit said power control signal to said base station;

a base station including a power control unit for controlling transmission power based on said power control signal; and a receiving unit configured to receive said power control signal transmitted from said terminal station.

10. A radio communications terminal apparatus for generating a power control signal to adjust a transmission power of a base station, said radio communications terminal apparatus comprising:

reception quality averaging means for generating an average received signal interference ratio given by averaging received signal interference ratios obtained from a received signal over a predetermined time period;

a signal interference ratio difference value generating means for generating signal interference ratio difference value by calculating a difference between said average received signal interference ratio and a target signal interference ratio;

first adjusting amount generating means for generating a first adjusting amount for said target signal interference ratio according to said signal interference ratio difference value;

detecting means for detecting whether a received signal has an error and for generating an error detection result;

second adjusting amount generating means for generating a second adjusting amount according to said error detection result;

selecting means for determining whether said signal interference ratio difference value is within a predetermined range, for selecting said second adjusting amount when said signal interference ratio difference value is within the predetermined range, and for selecting said first adjusting amount when said signal interference ratio difference value is not within the predetermined range;

updated target signal interference ratio generating means for generating an updated target signal interference ratio by updating said target signal interference ratio generated previously based on said selected one of said first adjusting amount and said second adjusting amount; and power control signal generating means for generating said power control signal based on the comparison result between said average received and said updated target signal interference ratio.

* * * * *